United States Patent [19]

Shanton

[11] Patent Number: 5,717,755
[45] Date of Patent: *Feb. 10, 1998

[54] DISTRIBUTED CRYPTOGRAPHIC OBJECT METHOD

[75] Inventor: M. Greg Shanton, Fairfax, Va.

[73] Assignee: TECSEC, Inc., Vienna, Va.

[*] Notice: The term of this patent shall not extend beyond the expiration date of Pat. No. 5,369,702.

[21] Appl. No.: 304,867

[22] Filed: Sep. 13, 1994

Related U.S. Application Data

[63] Continuation of Ser. No. 138,857, Oct. 18, 1993, Pat. No. 5,369,702.

[51] Int. Cl.⁶ .................... H04L 9/32; H04L 9/00
[52] U.S. Cl. .................... 380/25; 380/4; 380/9; 380/21; 380/23; 380/28; 380/49; 380/50; 340/825.31; 340/825.34
[58] Field of Search .................... 380/3, 4, 5, 9, 380/10, 21, 23, 24, 25, 28, 30, 43, 49, 50; 340/825.31, 825.34; 455/33.3

[56] References Cited

U.S. PATENT DOCUMENTS

| | | | |
|---|---|---|---|
| 4,218,582 | 8/1980 | Hellman et al. | 380/30 |
| 4,405,829 | 9/1983 | Rivest et al. | 380/30 |
| 4,424,414 | 1/1984 | Hellman et al. | 380/30 |
| 4,713,753 | 12/1987 | Boebert et al. | 380/4 X |
| 4,864,616 | 9/1989 | Pond et al. | 380/25 |
| 4,955,082 | 9/1990 | Hattori et al. | 455/33.3 |
| 4,962,533 | 10/1990 | Krueger et al. | 380/25 |
| 4,984,272 | 1/1991 | McIlroy et al. | 380/25 |
| 5,052,040 | 9/1991 | Preston et al. | 380/4 |
| 5,065,429 | 11/1991 | Lang | 380/25 |
| 5,191,611 | 3/1993 | Lang | 380/25 |
| 5,204,961 | 4/1993 | Barlow | 380/4 X |
| 5,369,702 | 11/1994 | Shanton | 380/4 |
| 5,369,707 | 11/1994 | Follendore, III | 380/25 |

Primary Examiner—Bernarr E. Gregory
Attorney, Agent, or Firm—Rabin, Champagne & Lynt, P.C.

[57] ABSTRACT

A system for increasing the security of a computer system, while giving an individual user a large amount of flexibility and power. To give users the most power and flexibility, a standard object that has the capability to embed objects is used. To allow users even more flexibility, a standard object tracking mechanism is used that allows users to distribute multiple encrypted embedded objects to other individuals in a single encrypted object. By effecting compartmentalization of every object by label attributes and algorithm attributes, multi-level multimedia security is achieved.

20 Claims, 8 Drawing Sheets

KING ALLEY CONSORTIUM
AMBI RIVER PROJECT

DISTRIBUTED CRYPTOGRAPHIC OBJECT METHOD

This is a continuation of U.S. patent application Ser. No. 08/138,857 filed Oct. 18, 1993; now U.S. Pat. No. 5,363,702.

FIELD OF THE INVENTION

The present invention relates generally to a system that can be used to restrict access to computer data. In particular, the system of the present invention restricts access in a flexible way, identifying objects for restriction and nesting restriction requirements through the use of embedded objects.

BACKGROUND OF THE INVENTION

While the specter of "spies" eagerly trying to obtain the defense information of various countries is very much still present in the defense and intelligence community, an equally massive threat now exists from technological or commercial "spies" who desire to obtain commercial and technical information from competing companies. These agents use sophisticated means similar to those used by the defense and intelligence community in order to obtain commercially valuable information that reveals the plans and commercial activities of competitors thereby allowing the aggressor company to obtain a competitive advantage in the marketplace. Theft of commercially valuable information is a very real and ever present threat.

To combat this type of commercial spying, various complex systems have evolved to protect company proprietary information. These systems involve physical controls over personnel as well as over the data flowing in and out of a company. For example, most computer systems used within companies require a password to be entered before the system can be accessed. It is frequently the case that confidential or company proprietary information must be passed electronically from one location to another in order to convey that information within the company in a timely fashion. Such electronic communication is easily susceptible to interception if not protected in some other form.

Cryptographic systems have evolved to fill the needs of companies and individuals wanting to protect the proprietary commercial information of a company from competitors and those who generally should not have that information. Encryption of data is therefore a critical requirement in denying access to confidential information from those who are not so authorized. Cryptographic "keys" are an essential part of the information encryption process. The cryptographic key, or "key" for short, is a sequence of letters, numbers, or bytes of information which are manipulated by a cryptographic algorithm to transform data from plain (readable) text to a series of unintelligible text or signals known as encrypted or cipher text. The key is then used by the receiver of the cipher text to decrypt the message back to plain text. However, for two people to communicate successfully using keys, each must use the same key, assuming that the same encryption/decryption algorithm is used on both ends of the communication.

Various methods have evolved to manage the distribution of keys. Such methods of distribution are collectively referred to as "key management" The function of key management is to perform the process of generating, distributing, changing, replacing, storing, checking on, and destroying cryptographic keys. Under normal operational circumstances, the key manager begins and ends a cryptographic session by controlling access to the algorithm used to encrypt and decrypt plain text objects. Thus, a user who wants to encrypt an object or decrypt an object must first access the key manager so that an encryption algorithm may be chosen.

Simple encryption of data being communicated between two points only provides one level of security, however. Encryption limits data communication to those who have the key. Anyone who has the key is privy to any communication at any location. That is, if a group of people are working on a particular project, they will all presumably share a key for decrypting information relating to the project. Some of the project group may be working in one location, while the rest of the group may be located in a distant city. If one member of the group wants to send a communication to a particular member in the other city, the key will afford him no protection because everyone in the project shares the same key. Likewise, if someone wants to communicate a message to a subset of the group, for example, only to management personnel, this key would again provide her with no extra security. In another case, someone may want to send a message that is capable of being read only at a particular computer terminal, or of being printed only at a particular printer. In these and other cases, multilevel multimedia key access, or individual keys issued to each person, would provide a solution, albeit one that is quite unwieldy, inflexible, and difficult to manage by a security officer or key administrator.

A secure method of labelling files or messages that are sent from a sending user to a receiving user over a network can provide a level of protection in addition to cryptographic protection. A file "label" for purposes of this invention means a series of letters or numbers, which may or may not be encrypted, separate from but associated with the sending of a message, which identifies the person, location, equipment, and/or organization which is permitted to receive the associated message. Using a secure labelling regimen, a network manager or user can be assured that only those messages meant for a certain person, group of persons, and/or location(s) are in fact received, decrypted, and read by the intended receiver. Thus, a sending user can specify label conditions that limit access to the transmitted message. For example, many people within a company may have the key necessary to read a data file that a sender may transmit from his computer terminal to other terminals at another site within his company. The sender may, however, wish to restrict reception to those persons present at a particular terminal. By employing a secure labelling technique in addition to encryption, the sender can be assured that people having the correct key to decrypt the message but working at different terminals will not receive or be allowed to access the communication. Access may be limited to particular people as well.

A system such as that described above is disclosed in U.S. patent application Ser. No. 08/009,741, Filed Jan. 27, 1993, the specification of which is incorporated by reference herein, now U.S. Pat. No. 5,389,707.

A system that can limit access on an object level would be more flexible and would offer still more protection. Access could be specified on an object-by-object basis, and objects could be embedded within other objects, providing an access hierarchy for users.

The ability to cryptographically secure objects ensures the authentication and data integrity of the particular object or objects in question. If a device were able to cryptographically control an object(s) or nested object(s), then that device would have total control over the entire object and all other objects within it. This type of control over the knowledge/information flow would allow for clear data separation, and at some levels could become a transparent method. A system that is able to do this would be able to achieve multi-level multimedia security.

SUMMARY OF THE INVENTION

It is therefore an objective of the present invention to provide a system to insure that properly specified kinds of information in a network system flows only to designated locations and to further insure that such information is only read by those individuals who are designated to review that information.

It is a further objective of the present invention to provide a system that recognizes objects and permits or denies access on the object level.

It is an additional objective of the present invention to provide a system in which objects may be embedded within other objects, resulting in an access hierarchy for users of the system.

It is another objective of the present invention to provide a system in which access control is transparent to the user.

These and other objectives and advantages of the present invention will be apparent to those of ordinary skill in the art upon inspection of the detailed description, drawings, and appended claims.

The definition and concept of objects varies greatly depending on with whom you consult. Everything around you in your daily life is an object. Your car, your car keys, books, people, desks, etc. objects are entities by themselves, but they may contain other objects, in either single or multiple configurations. Objects can change their make up dynamically by inheritance. Objects can inherit the attributes of other objects and the inheritance features can change dynamically "on the fly" during the operation of the objects.

In the context of the present invention, an object can come in a vast number of forms, shapes or sizes and can be either passive or active, dynamic or static. An object may stay dormant until it is acted upon, or it may be an active participant, dynamically auditing and verifying every transaction that occurs in a system. Examples of what an object can be include a bit of information, a byte of information, Sound Clips, Video Clips, Graphic Images, text, charts, tables, forms, controls, MDIForms, variables, executable files, video files, binary files, text files, data files, container files, graphic files, application file(s), Library files, a directory, a collection of directories, a hard disk, multiple hard disks, any hardware component, any software component, a complete computer system, a single network, multiple networks.

Thus, an object is any distinct, separate entity. In a computer or data communication context, entities that may be treated as objects include:

1) Program objects, representing applications such as word processors, spreadsheets, games, etc., as well as utilities and operating systems;
2) Folder objects, representing collections of other objects;
3) Data file objects, including information such as text, memos, letters, spreadsheets, video, and sound; and
4) Device objects, such as printers, fax modems, plotters, and CD-ROM drives.

In object linking and embedding, an object can be any userselected group of data, such as a block of text, a set of spreadsheet cells, a chart, sounds, or a graphical image. This data can be embedded in or linked to another document created by a different application. For example, a folder may represent a directory and may contain a group of files, or it may represent a group of programs. Folders can also contain other folders.

In object-oriented programming, a program consists of a set of related but self-contained objects that can contain both code and data.

The present invention is able to increase the security of the system, while at the same time giving the individual user a large amount of flexibility and power. To give users the most power and flexibility, a standard object that has the capability to embed objects is used. To allow users even more flexibility, a standard object tracking mechanism is used that allows users to distribute multiple encrypted embedded objects to other individuals in a single encrypted object. By being able to compartment every object by label attributes and algorithm attributes, multi-level multimedia security is achieved.

Multi-level security is achieved because encrypted objects may be nested within other objects which are also encrypted, possibly within other objects, resulting in multiple layers of encryption. Multimedia security is achieved because objects are encrypted. Where other encryption systems encrypt only files or other data, the system of the present invention encrypts any object, encompassing all forms of media. Thus, the nesting of individually encrypted objects provides security that is multi-level and multimedia.

DETAILED DESCRIPTION OF THE INVENTION

Definitions

OOKeyMan stands for the Object-Oriented Key Manager. OOKeyMan is a Microsoft Windows stand alone application.

The Auto Application Interface is an intelligent front end and back end interface between a standard Microsoft Windows 3.1 application and OOKeyMan.

An Encrypted Embedded object is an encrypted OOKeyMan object which can contain a single plain text object that has been encapsulated within the encrypted object, or it can contain an infinite web of encrypted objects matched with plain text objects or other cipher text objects.

A container object is an object that contains other objects. These objects can be either cipher text or plain text. This is the transport vehicle for a standard object mechanism that embeds objects. A non-container object is an object that does not contain other objects.

Multi-Level Multimedia Security is defined as the ability to have simultaneous control over the knowledge/ information flow of numerous media formats while allowing for clear data separation. At some levels the multi-level multimedia security becomes transparent. Examples of multi-media objects would include a file that contained two or more of the following: sound objects, video objects, graphic V, text objects, chart objects, table objects, and form objects.

Disclosure

The present invention, known as the Distributed Cryptographic Object Method ("DCOM"), is able to control which objects are visible to a specific user, which object attributes are inherited by other objects, which objects are available for use, and which level of system implementation can become transparent.

The main function of the DCOM is to securely manage and track encrypted objects. The DCOM can securely manage and track a single encrypted object, or it can securely manage and track encrypted objects embedded within other encrypted objects. The capability to securely manage and track encrypted objects within other encrypted objects is only limited by storage space.

Figure 1:
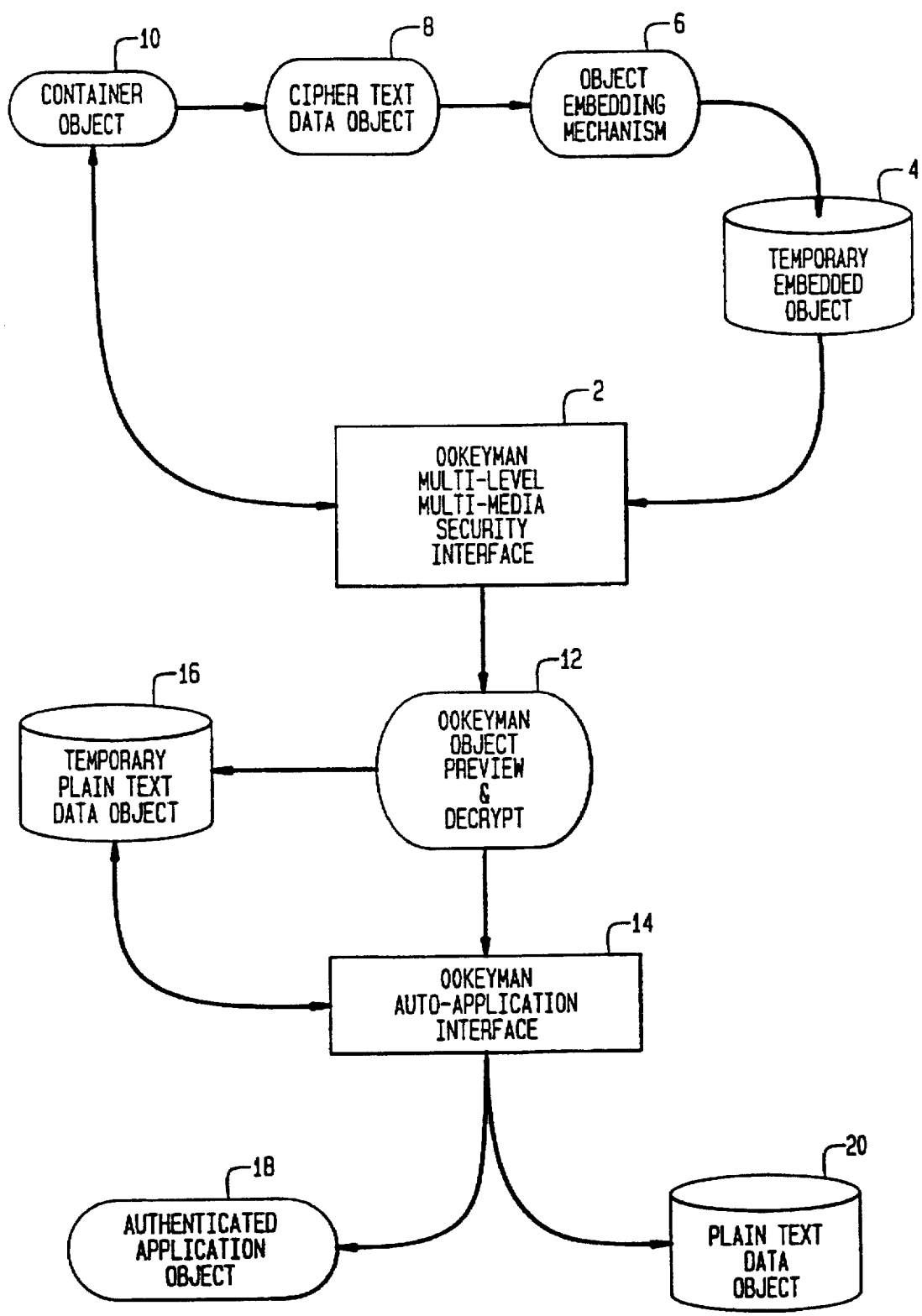
FIG. 1 shows a block diagram of the system of the present invention.

Referring to FIG. 1, the DCOM system is described. The DCOM has a standard Multi-Level Security object interface 2 that interfaces with the plain text container object's encrypted embedded object(s) 4. It does this through a standard application 6 that has the capability to embed an object in a container object, such as Microsoft's Object Package for Windows. After the Encrypted object(s) is/are embedded in a standard container object(s) 10 and the container object(s) 10 is/are encrypted, the original encrypted object(s) and the new encrypted container object(s) is/are ready for transport.

Figure 2:
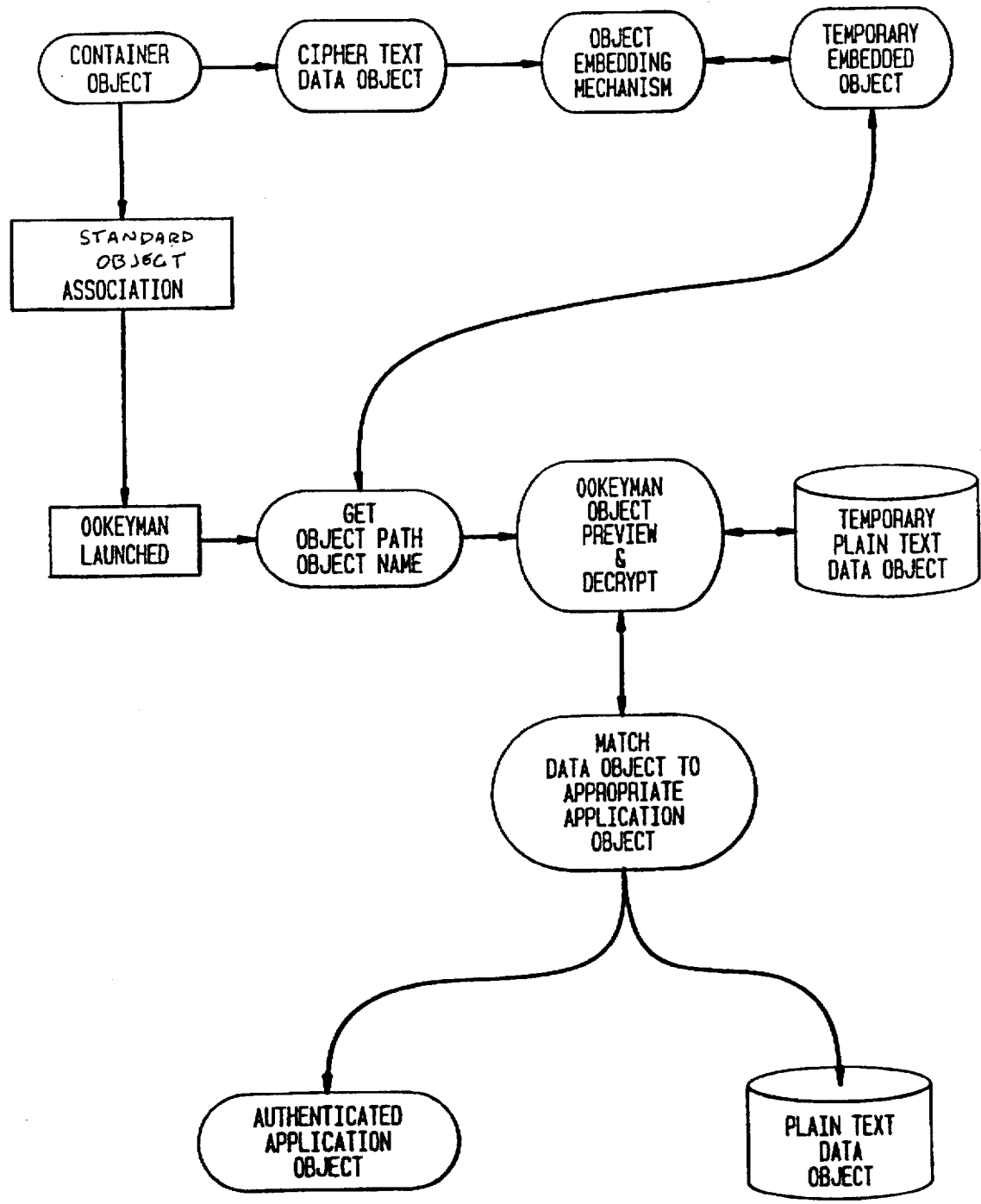
FIG. 2 shows a block diagram of the system of the present invention when an embedded encrypted object is activated.

The new encrypted object(s) can be easily transported/ routed over any network that supports binary travel without modification. The original encrypted objects can be deleted because all information from the original encrypted objects is encapsulated in the embedded encrypted object. All of the nested embedded encrypted objects will appear to a user as a single encrypted object until extracted with a standard object embedding/extracting mechanism through the DCOM process. To activate an embedded encrypted object, the user simply selects the encrypted object to initiate the DCOM process, launching the OOKeyMan application, as shown in FIG. 2. The user/encrypted object authentication process is started and if the user/encrypted object is/are approved, the following encrypted object information can be returned and used by the user:

A. Plain Text Object Name
B. Plain Text Object Location
C. Plain Text Object Application
D. Plain Text Object Environment
E. Plain Text Object Date
F. Plain Text Object Time
G. Plain Text Object Digital Signature
H. Code word Object Tracking Label
I. Cluster Object Tracking Label
J. Device Object Tracking Label
K. Use Object Label
L. Algorithm Object Type At this point, the authenticated user is given the option to decrypt the requested embedded encrypted object 12. After decryption, a check is done to match the encrypted object's plain text object application to the correct Intelligent Auto Application Interface 14. If the correct Auto Application Interface is not found, a notice is returned and the object is copied to a temporary location 16, otherwise the Auto Application Interface process is started. During this process the encrypted object is matched to the appropriate authenticated application object 18 according to the returned encrypted object information. The correct authenticated application object 18 is then activated with the plain text object 20. Due to the relative dynamic nature of objects, the DCOM is able to accomplish all tasks "on the fly".

The scope of the DCOM directly correlates to the level at which the DCOM was embedded into the system. The scope of the DCOM would cover the implemented embedded system level and all system levels above that, appearing transparent to all levels beneath the implemented embedded system level. For instance, if the DCOM were was embedded at the Open System Interconnection ("OSI") 7 Application layer, then the scope of the DCOM would cover objects on that level and above. In this scenario, the DCOM could run transparent to OSI levels 1 through 6. On the basis of current technology, this implementation would produce the most flexible DCOM. At this level and above, the DCOM is able to provide multi-level multi-media security while staying at the document level. This cross-application compatibility or document-level security is critical to the evolving component based document centered computer system desktop. The DCOM achieves cross-application multi-level multi-media security at the document level through its use of Object-Based Security.

The current implementation of the DCOM at the application layer is called the Object-Oriented Key Manager (OOKeyMan). Currently, OOKeyMan is a Microsoft Windows 3.1 stand alone application, but the DCOM can be applied to other environments. OOKeyMan provides Document-Level Security through its use of Object Based Security.

Some examples of where the DCOM can be applied to ensure the authentication and data integrity of objects include:

IBMt's OS/2 2.X and above

IBMt's System Object Method(SOM)

Microsoft's Object Package

Microsoft's Object Linking and Embedding 1.0(OLE 1.0)

Microsoft's Object Linking and Embedding 2.0(OLE 2.0)

Microsoft's Windows NT 3.1

Microsoft's Cairo (Future Operating System)

Microsoft's Chicago (Future Operating System)

Taligent (joint venture future Operating System of Macintosh and IBM)

Macintosh's Compound Document Standard

Macintosh Operating System

Novell

Novell Netware Directory Services(NDS)

Unix Object-Oriented Systems

Virtual/Alternate Reality Systems

Future Object-Oriented Operating Systems

By applying the DCOM to the above examples, the security of a system can be moved to a more abstract object level. By securing objects with cryptography, a level of security is achieved much higher than that of common access control mechanisms such as password or pass phrase protection.

The steps for embedding an Encrypted Embedded OOKeyMan Object(s) are as follows:

1. User Creates a plain text Object by using a standard application;
2. User Encrypts Object(s) with OOKeyMan;
3. User uses a standard Container Object;
4. Using Standard object to embed Encrypted Embedded OOKeyMan object(s) into Container Object;
5. Encrypt Container Object;
6. Repeat Steps 1 through 5 until all Objects are encrypted;
7. Multi-Level Multimedia Security achieved at the document level.

EXAMPLES OF THE DISTRIBUTED CRYPTOGRAPHIC OBJECT METHOD

The following resources were used in the following examples:

Software:

MS-DOS 5.0

Microsoft Windows 3.1

Microsoft Word for Windows 2.0c

Standard Microsoft Object Package

WordPerfect 5.2 for Windows

OOKeyMan 1.0b

Auto Application Interface for Word 1.0

Auto Application for WordPerfect 5.2 for Windows 1.0

Hardware:

486 50 MHz DX with 16 megabytes of RAM

The next two examples demonstrate some of the capabilities of the DCOM through the OOKeyMan implementation. The examples involve two of the most popular standard Microsoft Windows applications on the market today; Word™ for Windows® and WordPerfect™ for Windows®. The examples also use a standard object, Standard Microsoft Object Package, to embed the encrypted files in a standard container object. The interfaces used for these examples were the Auto Application Interface for Word for Windows 1.0 and the Auto Application for WordPerfect 5.2 for Windows 1.0.

The first example shows the ability for OOKeyMan to securely manage and track single or multiple embedded encrypted objects within other encrypted objects. This is done with a single application.

The second example shows the ability for OOKeyMan to securely manage and track single or multiple embedded encrypted objects within other encrypted objects. The embedded encrypted objects can even be part of encrypted objects from other applications. This example is performed in a cross-application manner between Word for Windows and WordPerfect for Windows.

Example 1

Document Level Multi-Level Multimedia Security (using Microsoft Word for Windows and WordPerfect 5.2 for Windows)

OOKeyMan Process

1. Lock object

A. User creates an object(s) in Word for Windows or WordPerfect for Windows;

B. User Initiates OOKeyMan sequence;

C. User Selects object(s) to Encrypt;

D. User Selects Labels for object;

E. User Selects an algorithm for encryption;

F. User Selects Lock Object;

G. OOKeyMan Object Manager perform Setup and Internal Checks;

H. OOKeyMan Object Manager Calls Key Management System object;

I. OOKeyMan Object Manager Calls Cryptographic Algorithm object;

J. OOKeyMan Object Manager waits for Selected Algorithm object to finish and create the encrypted object;

K. Encrypted OOKeyMan Object Created;

i. Results in Encapsulation of
    a. Plain Text Object
    b. Plain Text Object Name
    c. Plain Text Object Location
    d. Plain Text Object Application
    e. Plain Text Object Environment
    f. Plain Text Object Date
    g. Plain Text Object Time
    h. Plain Text Object Digital Signature
    i. Code word Object Tracking Label
    j. Cluster Object Tracking Label
    k. Device Object Tracking Label
    l. Use Object Label
    m. Algorithm Object Type ii. Results in New Encrypted Object being created iii. Results in Plain Text Object Being Delete if Requested L. OOKeyMan Object Manager Returns To Word for Windows or WordPerfect for Windows.

2. Unlock Object

A. User creates an encrypted object(s) using Word for Windows or WordPerfect for Windows;

B. User Initiates OOKeyMan sequence;

C. User Selects object(s) to Decrypt;

D. User Selects Unlock object;

E. OOKeyMan Decrypt Object;

F. OOKeyMan Object Manager performs Setup and Internal Checks;

G. OOKeyMan Object Manager Calls Key Management System object;

M. OOKeyMan Object Manager Calls Algorithm object;

I. OOKeyMan Object Manager waits for Selected Algorithm object to finish and create the decrypted object;

J. If the User/encrypted Object are authenticated the plain text object is activated along with Word for Windows or WordPerfect for Windows.

3. Preview Object

A. User creates an encrypted object(s) in Word for Windows or WordPerfect for Windows;

B. User Initiates OOKeyMan sequence;

C. User Selects object(s) to Preview;

D. User selects Preview Object;

E. OOKeyMan Display Header Object;

F. OOKeyMan Object Manager performs Setup and Internal Checks;

G. OOKeyMan Object Manager Calls Key Management System object;

H. OOKeyMan Object Manager waits for Selected Algorithm object to finish and create the Header object.

Example 2

Cross-Application Multi-Level Multimedia Security at The Document Level (Between Microsoft Word for Windows and WordPerfect 5.2 for Windows)
OOKeyMan Process:
1. Lock Object
 A. User creates an object(s)in Word for Windows or WordPerfect for Windows;
 B. User Initiates OOKeyMan sequence;
 C. User Selects object(s) to Encrypt;
 D. User Selects Labels for object;
 E. User Selects an algorithm for encryption;
 F. User Selects Lock Object;
 G. OOKeyMan Object Manager Performs Setup and Internal Checks;
 H. OOKeyMan Object Manager Calls Key Management System object;
 I. OOKeyMan Object Manager Calls Cryptographic Algorithm object;
 J. OOKeyMan Object Manager waits for Selected Algorithm object to finish and create the encrypted object;
 K. Encrypted OOKeyMan Object Created;
  i. Results in Encapsulation of
   a. Plain Text Object
   b. Plain Text Object Name
   c. Plain Text Object Location
   d. Plain Text Object Application
   e. Plain Text Object Environment
   f. Plain Text Object Date
   g. Plain Text Object Time
   h. Plain Text Object Digital Signature
   i. Code word Object Tracking Label
   j. Cluster Object Tracking Label
   k. Device Object Tracking Label
   l. Use Object Label
   m. Algorithm Object Type
  ii. Results in New Encrypted Object being created
  iii. Results in Plain Text Object Being Delete if Requested
OOKeyMan Object Manager Returns To Word for Windows or WordPerfect for Windows.
2. Unlock Object
 A. User creates an encrypted object(s) in Word for Windows or WordPerfect for Windows;
 B. User Initiates OOKeyMan sequence;
 C. User Selects object(s) to Decrypt;
 D. User Selects Unlock object;
 E. OOKeyMan Decrypt Object;
 F. OOKeyMan Object Manager Performs Setup and Internal Checks;
 G. OOKeyMan Object Manager Calls Key Management System object;
 H. OOKeyMan Object Manager Calls Algorithm object;
 I. OOKeyMan Object Manager waits for Selected Algorithm object to finish and create the decrypted object.
 J. If the User/encrypted Object are authenticated the plain text object is activated along with Word for Windows or WordPerfect for Windows.
3. Preview Object
 A. User creates an encrypted object(s) in Word for Windows or WordPerfect for Windows;
 B. User Initiates OOKeyMan sequence;
 C. User Selects object(s) to Preview;
 D. User selects Preview Object;
 E. OOKeyMan Display Header Object;
 F. OOKeyMan Object Manager Setup and Internal Checks;
 G. OOKeyMan Object Manager Calls Key Management System object;
 H. OOKeyMan Object Manager waits for Selected Algorithm object to finish and create the Header object.

Example 3

Standard Distributive Cryptographic Object Method Process (DCOMP)
OOKeyMan Process
1. Lock Object
 A. User creates an object(s);
 B. User Initiates OOKeyMan sequence;
 C. User Selects object(s) to Encrypt;
 D. User Selects Labels for object;
 E. User Selects an algorithm for encryption;
 F. User Selects Lock Object;
 G. OOKeyMan Object Manager Performs Setup and Internal Checks;
 H. OOKeyMan Object Manager Calls Key Management System object;
 I. OOKeyMan Object Manager Calls Cryptographic Algorithm object;
 J. OOKeyMan Object Manager waits for Selected Algorithm object to finish and create the encrypted object;
 K. Encrypted OOKeyMan Object Created;
  i. Results in Encapsulation of
   a. Plain Text Object
   b. Plain Text Object Name
   c. Plain Text Object Location
   d. Plain Text Object Application
   e. Plain Text Object Environment
   f. Plain Text Object Date
   g. Plain Text Object Time
   h. Plain Text Object Digital Signature
   i. Code word Object Tracking Label
   j. Cluster Object Tracking Label
   k. Device Object Tracking Label
   l. Use Object Label
   m. Algorithm ObJect Type
  ii. Results in New Encrypted Object being created
  iii. Results in Plain Text Object Being Delete if Requested
 L. OOKeyMan Object Manager Returns To Application Object.
2. Unlock Object
 A. User creates an encrypted object(s);
 B. User Initiates OOKeyMan sequence;
 C. User Selects object(s) to Decrypt;
 D. User Selects Unlock object;
 E. OOKeyMan Decrypt Object;
 F. OOKeyMan Object Manager Performs Setup and Internal Checks;
 G. OOKeyMan Object Manager Calls Key Management System object;
 H. OOKeyMan Object Manager Calls Algorithm object
 I. OOKeyMan Object Manager waits for Selected Algorithm object to finish and create the decrypted object.
3. Preview Object
 A. User creates an encrypted object(s);
 B. User Initiates OOKeyMan sequence;
 C. User Selects object(s) to Preview;
 D. User selects Preview Object;
 E. OOKeyMan Display Header Object;
 F. OOKeyMan Object Manager Performs Setup and Internal Checks;
 G. OOKeyMan Object Manager Calls Key Management System objects
 H. OOKeyMan Object Manager waits for Selected Algorithm object to finish and create the Header object.

The DCOM process can be applied to a vast number of areas in the real world. Whether it be the physical topology of the local area network/wide area network environment or the dynamic structure of an organization, the DCOM process will change dynamically to reflect the current state of the object in question.

Figure 3:
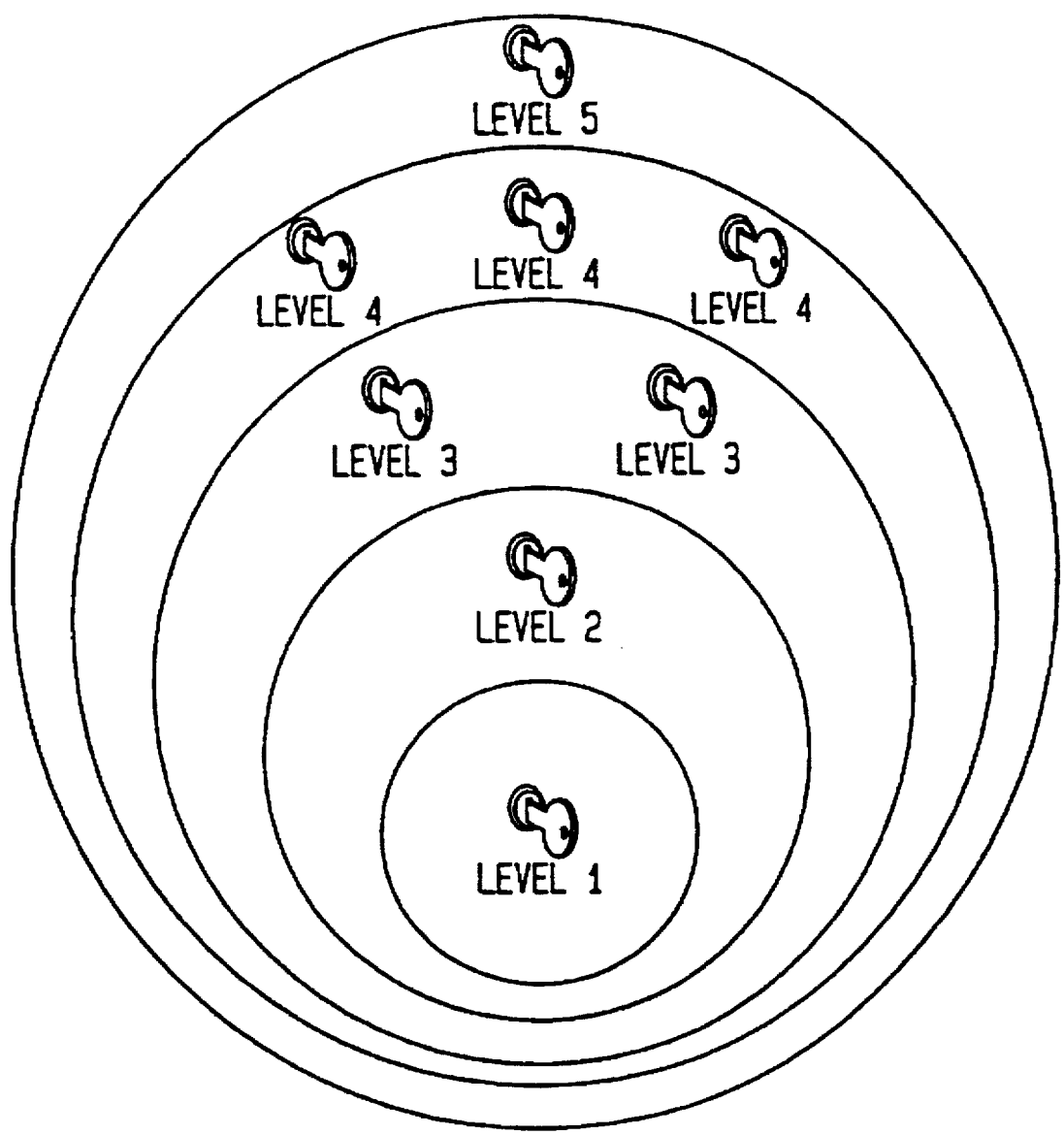
FIG. 3 shows an object containing ten embedded encrypted objects at five various levels.
Figure 4:
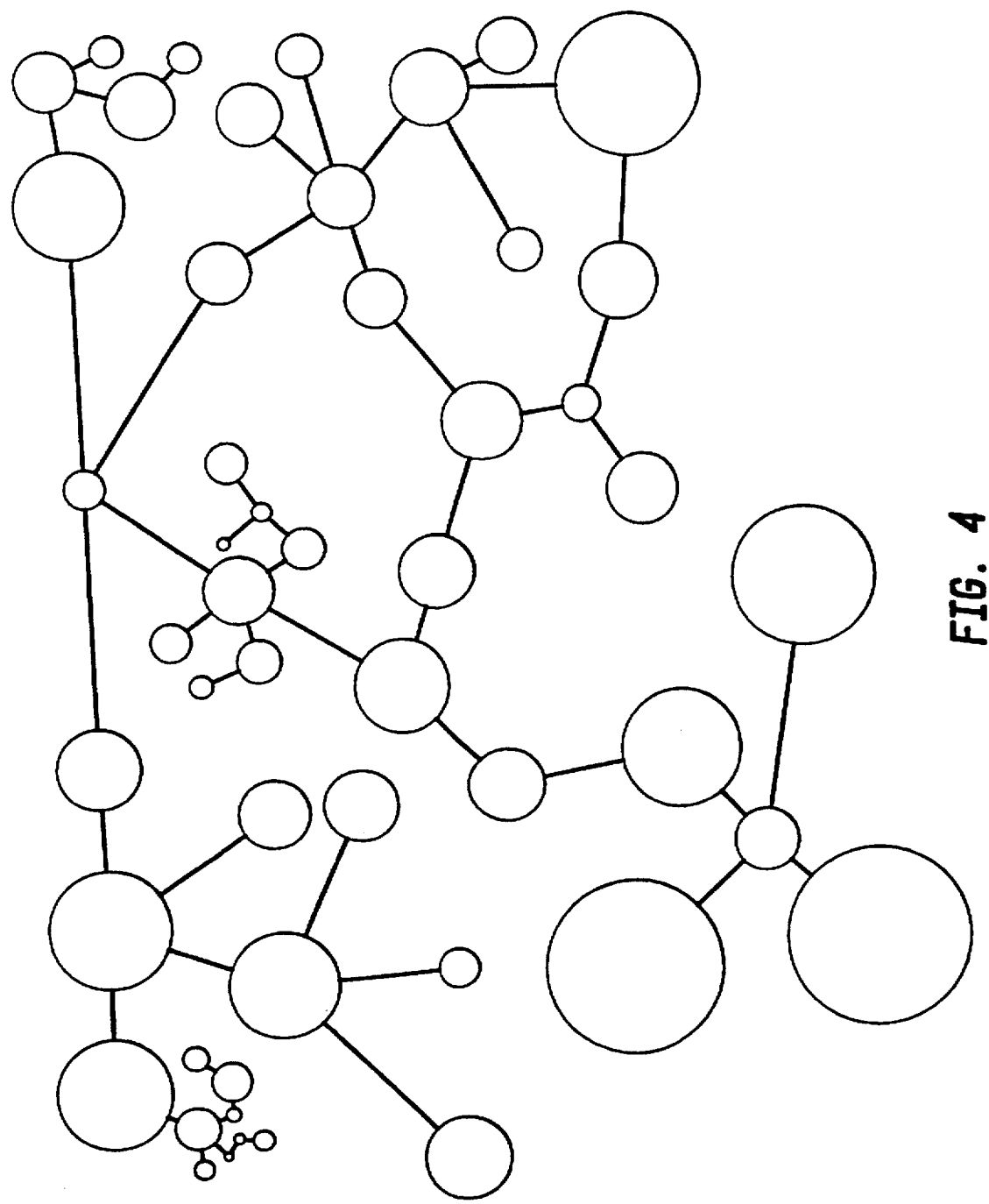
FIG. 4 shows an encrypted object that contains a web of embedded encrypted objects nested within it.

FIG. 3 and FIG. 4 show an encrypted object that contains a web of embedded encrypted objects nested within the other encrypted objects. The object shown in FIG. 3 contains ten embedded encrypted objects at five various levels. The encrypted object embedded in level 5 was embedded in an object in level four, level four objects in level 3 and so on. The plain text object containing the level 5 encrypted object can then be encrypted for further security. This single encrypted object encapsulates all of the data associated with the encrypted objects within it and therefore the entire encrypted object can then be sent out via any transport mechanism supporting binary file transfer.

FIG. 4 shows an encrypted object that contains a web of embedded encrypted objects nested within it. All of the attached embedded encrypted objects are fused together resulting in a single encapsulated encrypted object. The DCOM is powerful enough to dynamically adapt to accommodate N dimensional objects. In the very near future computing systems incorporating technology such as Virtual/Alternate Reality and Cyberspace, will need systems that can secure N dimensions.

Figure 5:
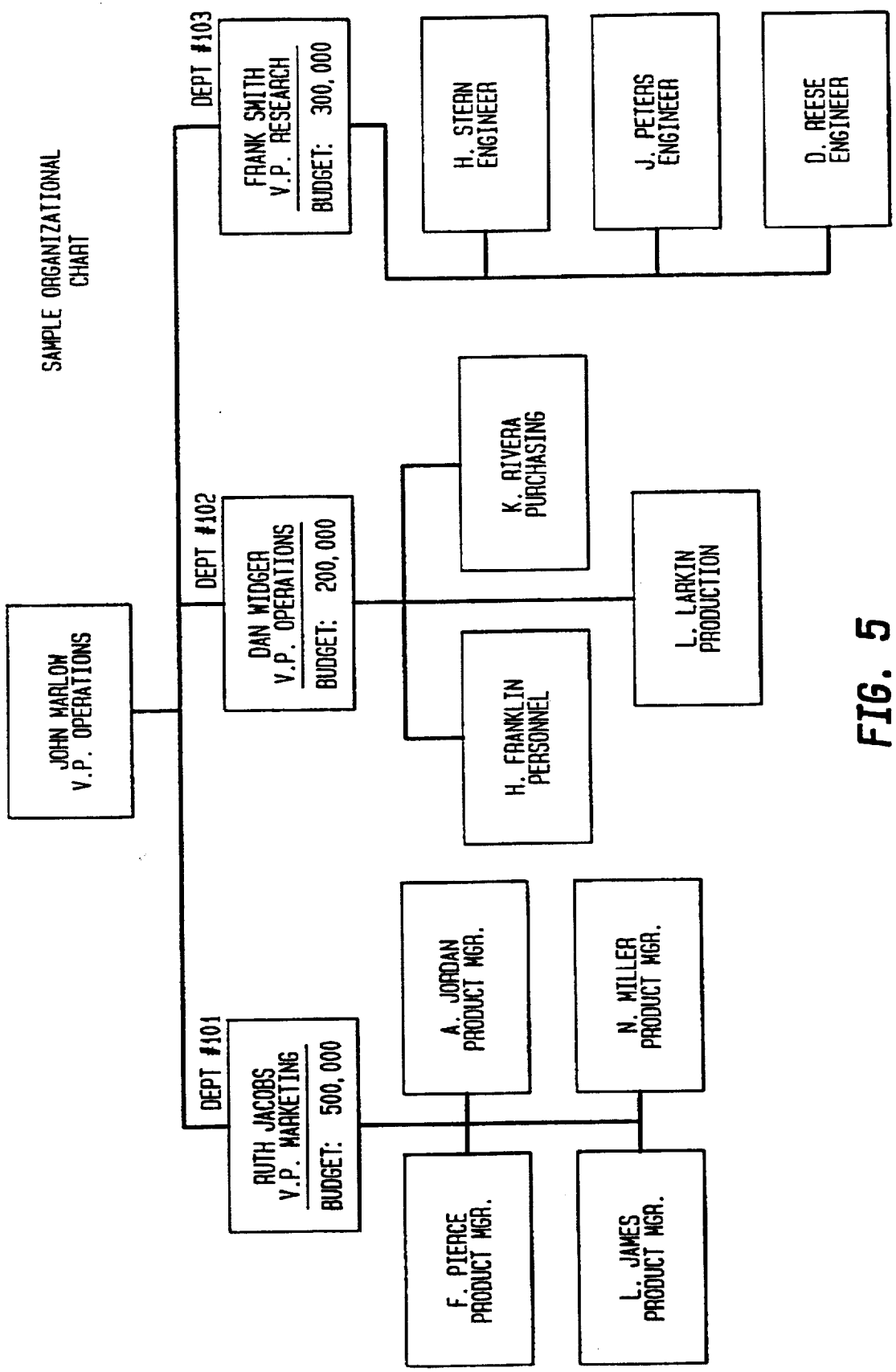
FIG. 5 shows a sample organizational chart.
Figure 6:
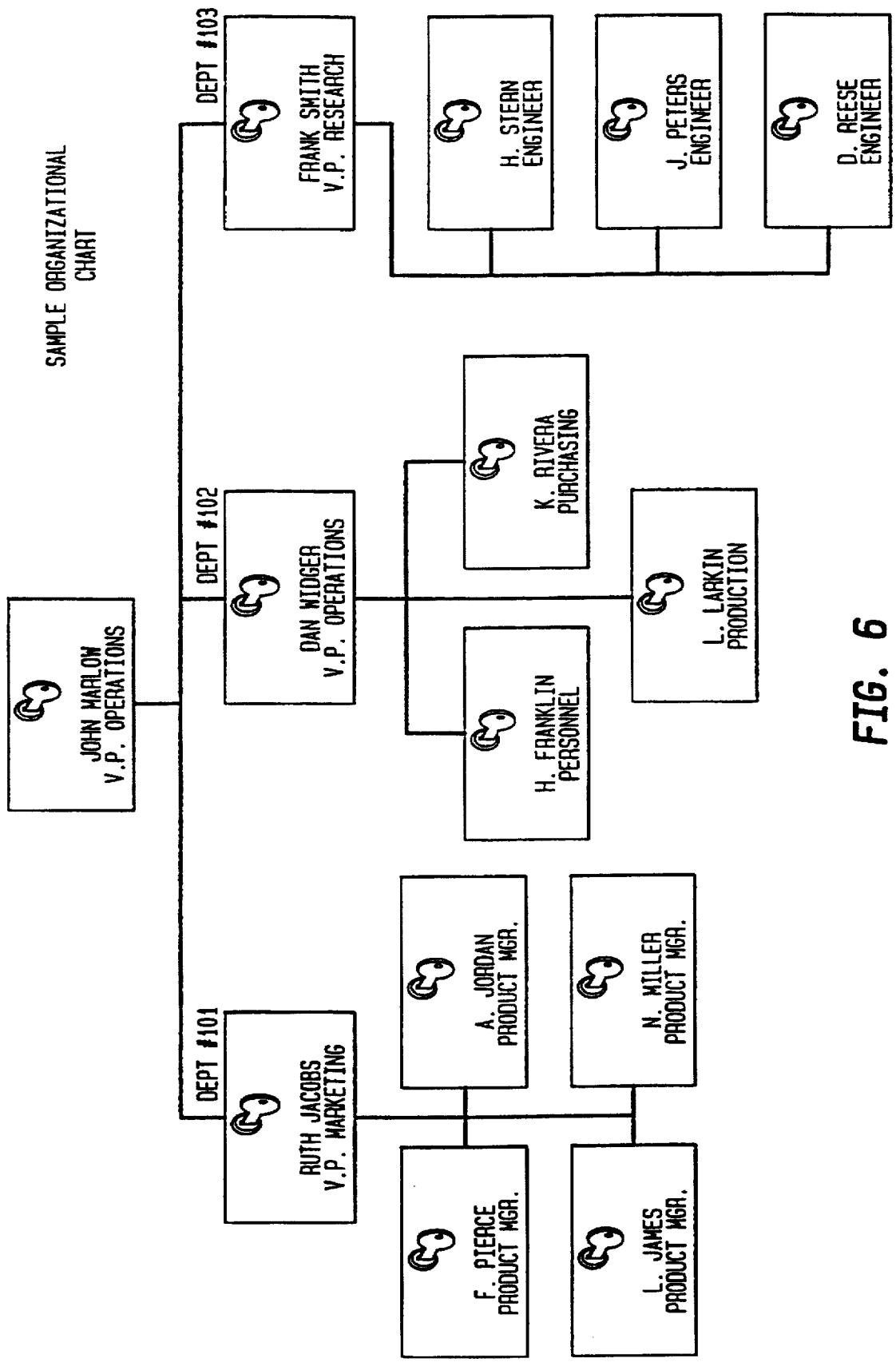
FIG. 6 shows the present invention used in conjunction with the dynamic structure of a sample organizational chart.
Figure 7:
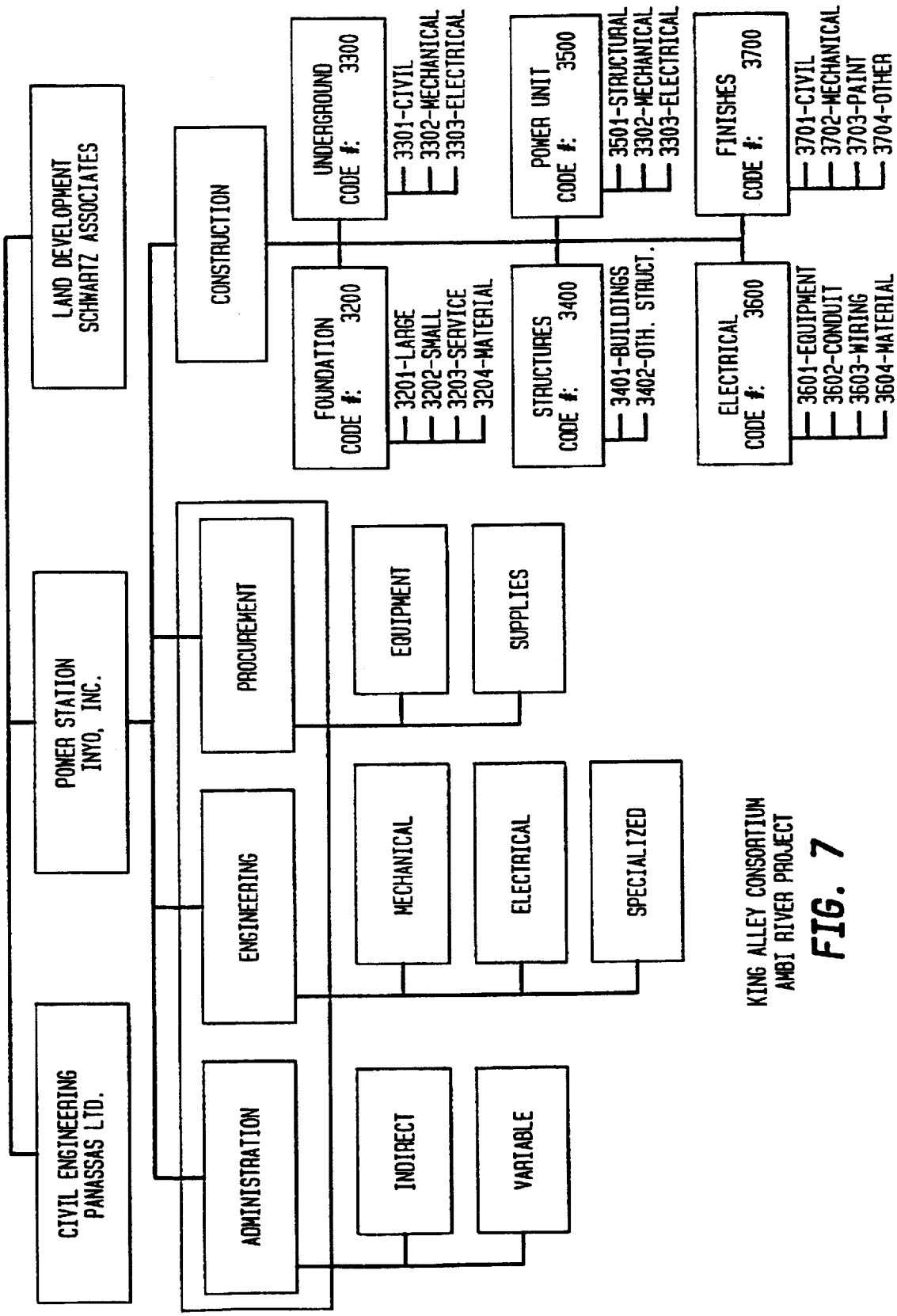
FIG. 7 shows a larger, more complicated sample organizational chart.
Figure 8:
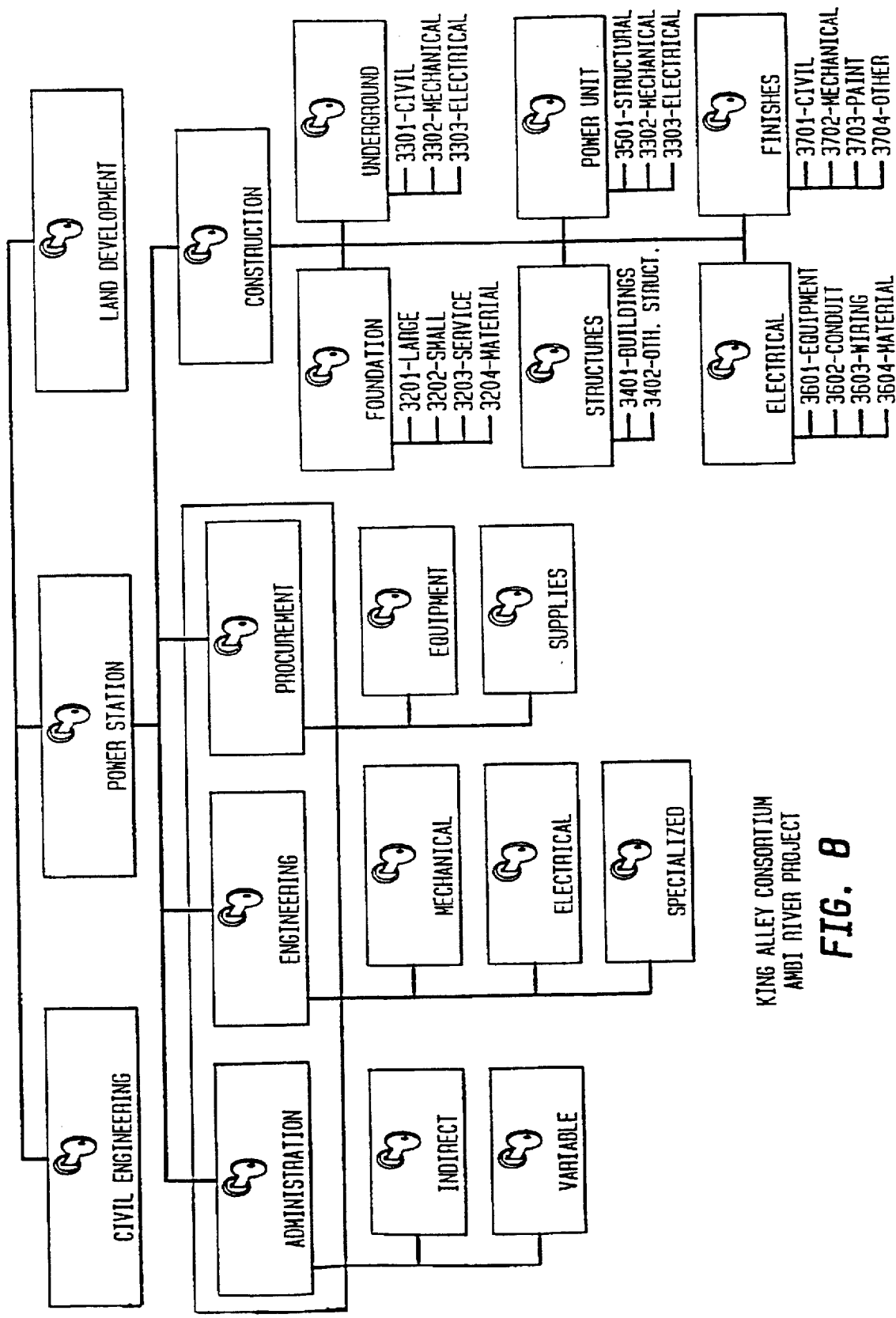
FIG. 8 shows the present invention used in conjunction with the dynamic structure of the larger, more complicated sample organizational chart.

The single encrypted objects shown in both FIGS. 3 and 4 can act as a secure package and can be sent out for distribution to an entire organization (e.g. E-mail). This single encrypted object can represent a branch(s), department(s), or even an entire company. Every employee would receive the single encrypted file, but they would only be able to unravel the portions that corresponded to them and acquire no knowledge of other existing embedded encrypted objects. For example, FIG. 5 displays a sample organization chart. When applied, the DCOM would control the knowledge/information flow of the organization and would allow for clear data separation, further compartmentalization through multiple algorithm use, and document-level security. With the improved communication paths, an organization would become more efficient. FIG. 6 demonstrates the use of the DCOM in conjunction with the dynamic structure of a sample organization. Since the DCOM is dynamic in nature, it can adapt to any organizational size or type (For example, see FIGS. 7 and 8).

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. A method for providing multi-level multimedia security in a data network, comprising:
   A) accessing an object-oriented key manager;
   B) selecting a first object to encrypt;
   C) selecting a first label for the first object;
   D) selecting an encryption algorithm;
   E) encrypting the first object according to the encryption algorithm;
   F) labelling the encrypted first object wherein the labelling comprises creating a display header;
   G) reading the first object label;
   H) determining access authorization based on the first object label; and
   I) allowing access to the first object only if access authorization is granted.

2. The method of claim 1, further comprising embedding the encrypted first object in a second object after labelling the encrypted first object.

3. The method of claim 2, further comprising:
   A) selecting a second label for the second object;
   B) selecting an encryption algorithm;
   C) encrypting the second object; and
   D) labelling the encrypted second object with a second object label.

4. The method of claim 3, further comprising
   A) reading the second object label;
   B) determining access authorization based on the second object label; and
   C) allowing access to the second object only if access authorization is granted.

5. The method of claim 4, further comprising decrypting the second object.

6. The method of claim 4, wherein allowing access to the second object includes deleting the second object.

7. The method of claim 3, wherein the second label is a second plurality of labels.

8. The method of claim 2, wherein embedding the first encrypted object in a second object includes covering the first encrypted object.

9. The method of claim 8, further comprising:
   A) selecting a second label for the second object;
   B) selecting an encryption algorithm;
   C) encrypting the second object;
   D) labelling the second encrypted object with a second object label;
   E) reading the second object label;
   F) determining access authorization based on the second object label; and
   G) uncovering the second object only if access authorization is granted.

10. The method of claim 1, wherein the first label is a first plurality of labels.

11. The method of claim 1, further comprising decrypting the first object.

12. The method of claim 1, wherein allowing access to the first object includes deleting the first object.

13. The system of claim 1, wherein allowing access to the first object includes access to the header file.

14. A system for providing multi-level multimedia security in a data network, comprising:
   A) a data processor, the data processor comprising:
      1) a system memory, comprising stored data;
      2) an encryption algorithm module, comprising logic for converting unencrypted objects into encrypted objects, the encryption algorithm module being disposed to access data stored in the system memory;
      3) an object labelling subsystem, comprising logic means for limiting object access, subject to label conditions, the object labelling subsystem being disposed to access data stored in the system memory and the object labelling subsystem being further disposed to accept inputs from the encryption algorithm module;
      4) a decryption algorithm module, comprising logic for converting encrypted objects into unencrypted objects, the decryption algorithm module being disposed to access data stored in the system memory means; and
      5) an object label identification subsystem, comprising logic for limiting object access, subject to label conditions, the object label identification subsystem being disposed to access data stored in the system memory and the object label identification subsystem being further disposed to accept inputs from the decryption algorithm module;

B) the encryption algorithm module working in conjunction with the object labelling subsystem to create an encrypted object such that the object label identification subsystem limits access to an encrypted object.

15. The system of claim 14, wherein the data processor further comprises embedded logic that embeds a first object within a second object.

16. The system of claim 15, wherein the data processor further comprises covering logic that covers the first object with the second object.

17. The system of claim 16, wherein the logic for limiting object access includes logic to uncover the first object.

18. A system for providing multi-level multimedia security in a data network, comprising:
A) means for accessing an object-oriented key manager;
B) means for selecting a first object to encrypt;
C) means for selecting a label for the first object;
D) means for selecting an encryption algorithm;
E) means for encrypting the first object;
F) means for embedding the first object within a second object;
G) means for labelling the encrypted first object;
H) means for reading the label;
I) means for determining access authorization based on the label; and
J) means for accessing the first object only if access authorization is granted;
K) the means for embedding the first object within a second object including means for covering the first object with a second object.

19. The system of claim 18, further comprising:
A) means for selecting the second object to encrypt;
B) means for selecting a second label for the second object;
C) means for encrypting the second object;
D) means for labelling the encrypted second object;
E) means for reading the second label;
F) means for determining access authorization based on the second label; and
G) means for accessing the second object only if access authorization is granted.

20. The system of claim 19, wherein the means for accessing the second object includes means for uncovering the first object.

* * * * *